D. T. TIMBERLAKE.
MOTOR TRUCK STEERING GEAR.
APPLICATION FILED OCT. 26, 1918.

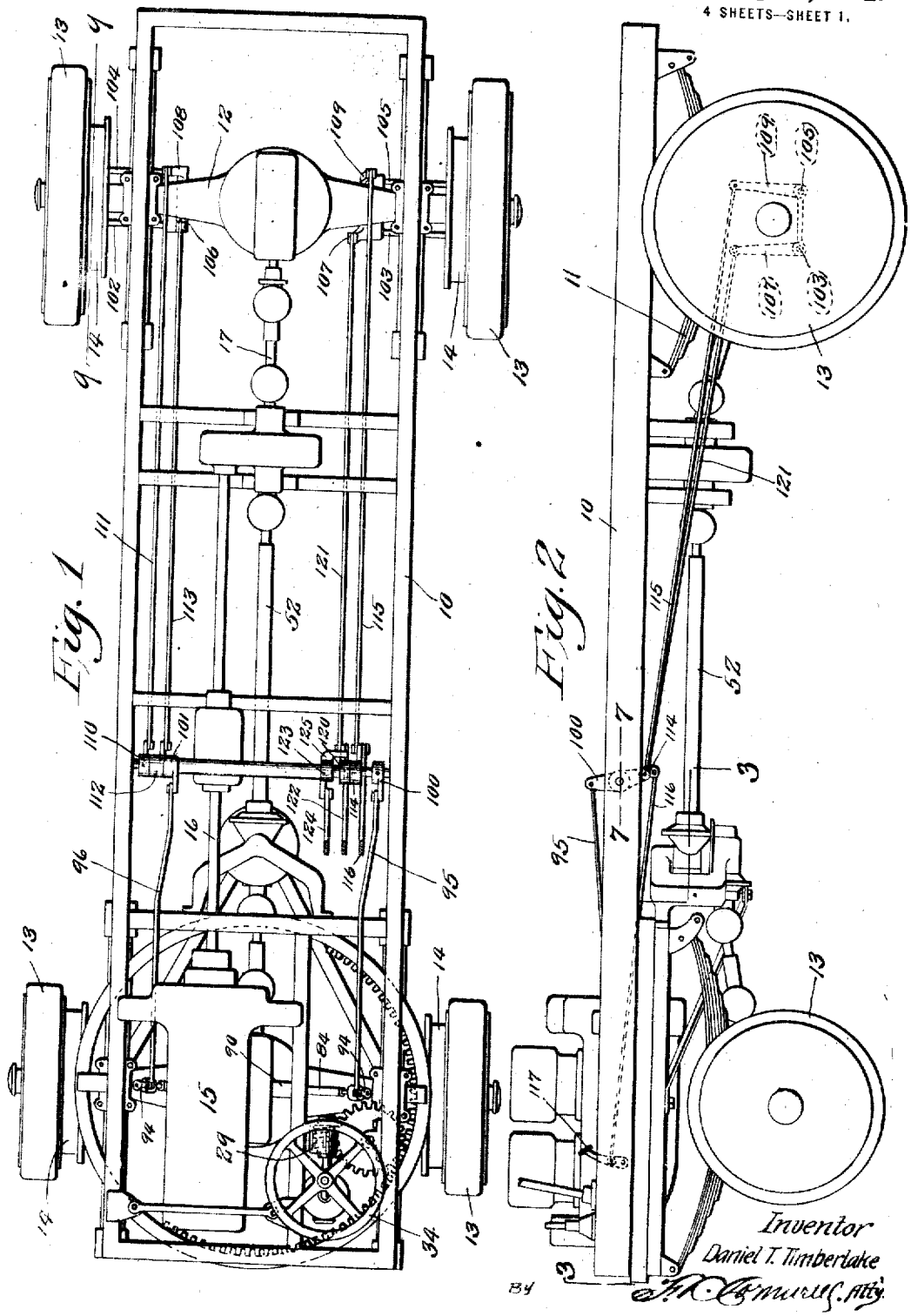

1,373,777.

Patented Apr. 5, 1921
4 SHEETS—SHEET 2.

Inventor
Daniel T. Timberlake,
By F. A. Cornwall, Atty

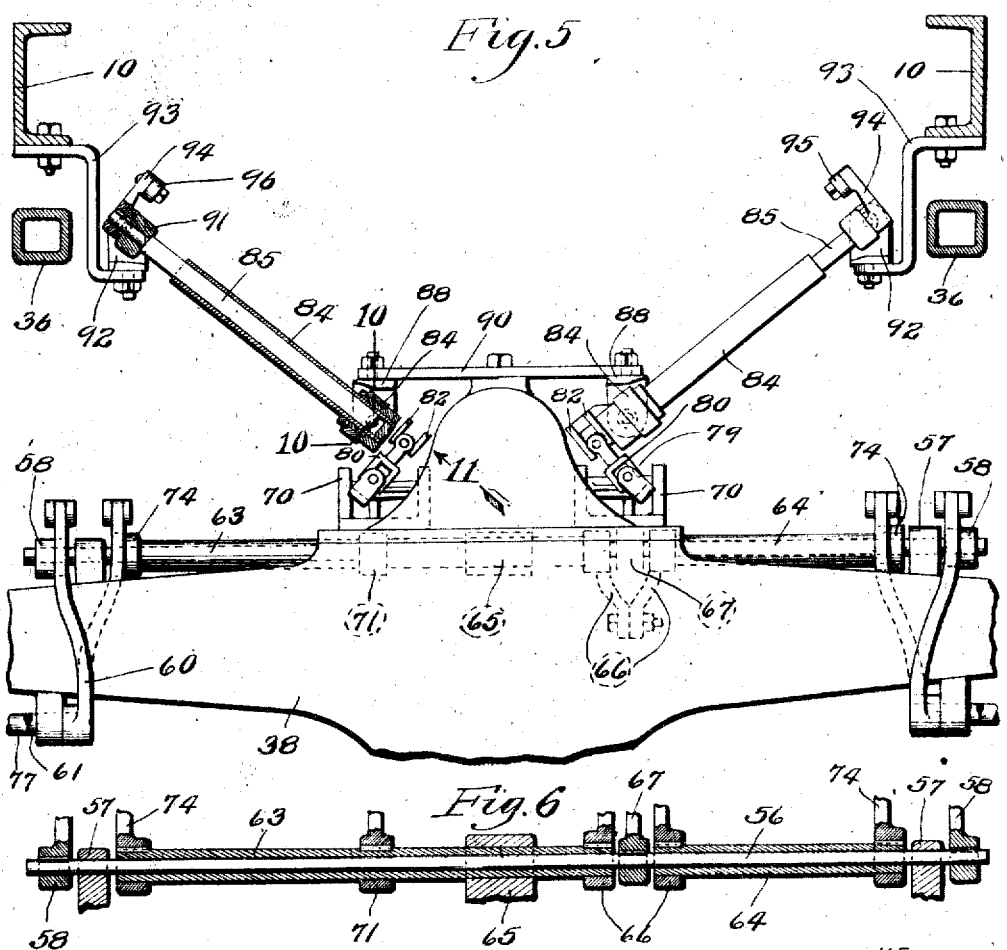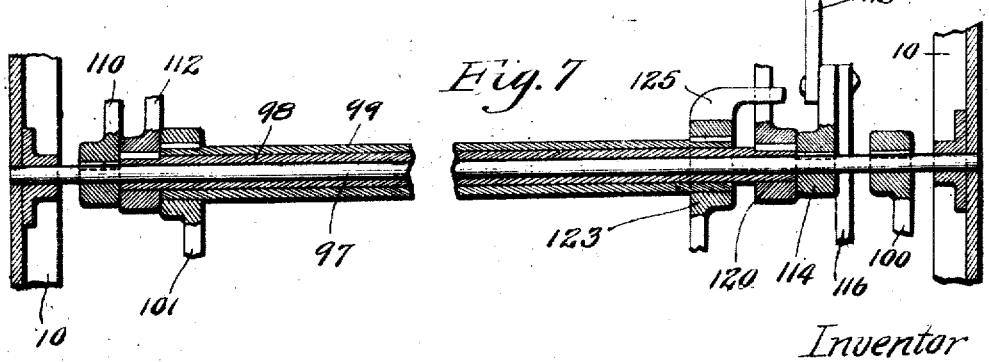

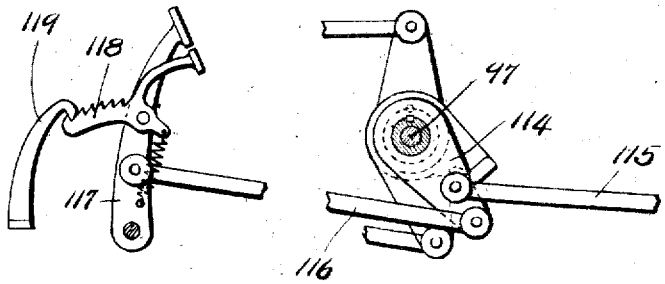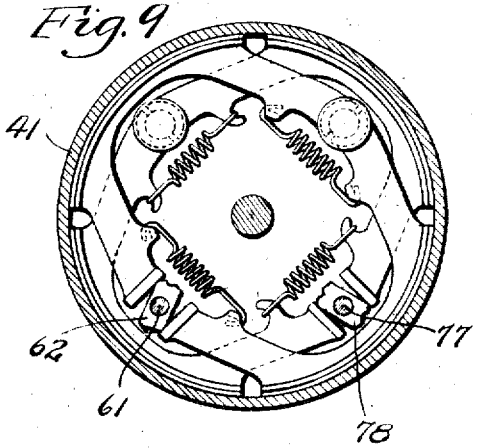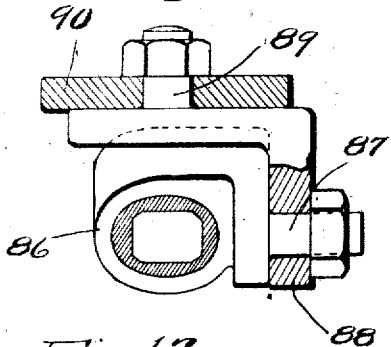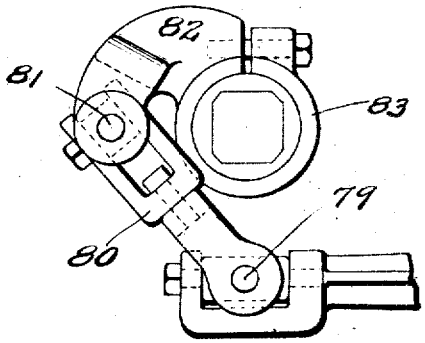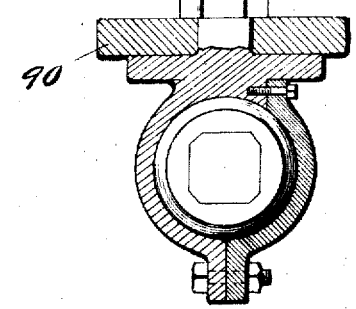

UNITED STATES PATENT OFFICE.

DANIEL T. TIMBERLAKE, OF ST. LOUIS, MISSOURI, ASSIGNOR TO UNIVERSAL MOTOR TRUCK AND TRACTION ENGINE COMPANY, OF ST. JAMES, MISSOURI, A CORPORATION OF MISSOURI.

MOTOR-TRUCK STEERING-GEAR.

1,373,777.      Specification of Letters Patent.      Patented Apr. 5, 1921.

Application filed October 26, 1918. Serial No. 259,743.

*To all whom it may concern:*

Be it known that I, DANIEL T. TIMBERLAKE, a citizen of the United States, residing at St. Louis, Missouri, have invented a certain new and useful Improvement in Motor-Truck Steering-Gears, of which the following is a full, clear, and exact description, such as will enable others skilled in the art to which it appertains to make and use the same, reference being had to the accompanying drawings, forming part of this specification.

My invention relates to motor trucks or engine driven vehicles, particularly of the type disclosed in my Patent No. 905,481, dated December 1, 1908 and my copending application filed March 8, 1917, Serial No. 153,307, the principal objects of my invention being to generally improve upon and simplify the constructions disclosed in the aforesaid patent and pending application; and to provide a relatively simple, easily operated and efficient steering mechanism for motor driven trucks, and further, to provide an improved brake system for trucks of the four wheel driven type.

With the foregoing and other objects in view, my invention consists in certain novel features of construction and arrangement of parts, hereinafter more fully described and claimed, and illustrated in the accompanying drawings, in which—

Figure 1 is a plan view of a motor truck of the type wherein all four wheels are positively driven and said truck being equipped with my improved steering apparatus and brake system.

Fig. 2 is an elevational view of the truck with my improvements applied thereto.

Fig. 5 is an enlarged cross section taken approximately on the line 5—5 of Fig. 3.

Fig. 6 is an enlarged cross section taken approximately on the line 6—6 of Fig. 3.

Fig. 7 is an enlarged horizontal section taken approximately on the line 7—7 of Fig. 2.

Fig. 8 is an enlarged elevational view partly in section of one of the brake actuating pedals and parts of the brake actuating mechanism.

Fig. 9 is an enlarged detail section taken approximately on the line 9—9 of Fig. 1.

Fig. 10 is an enlarged detail section taken approximately on the line 10—10 of Fig. 5.

Fig. 11 is an enlarged elevational view taken looking in the direction indicated by the arrow 11, Fig. 5.

Fig. 12 is a sectional view illustrating a modification of the form of universal joint illustrated in Fig. 10.

Figure 3:
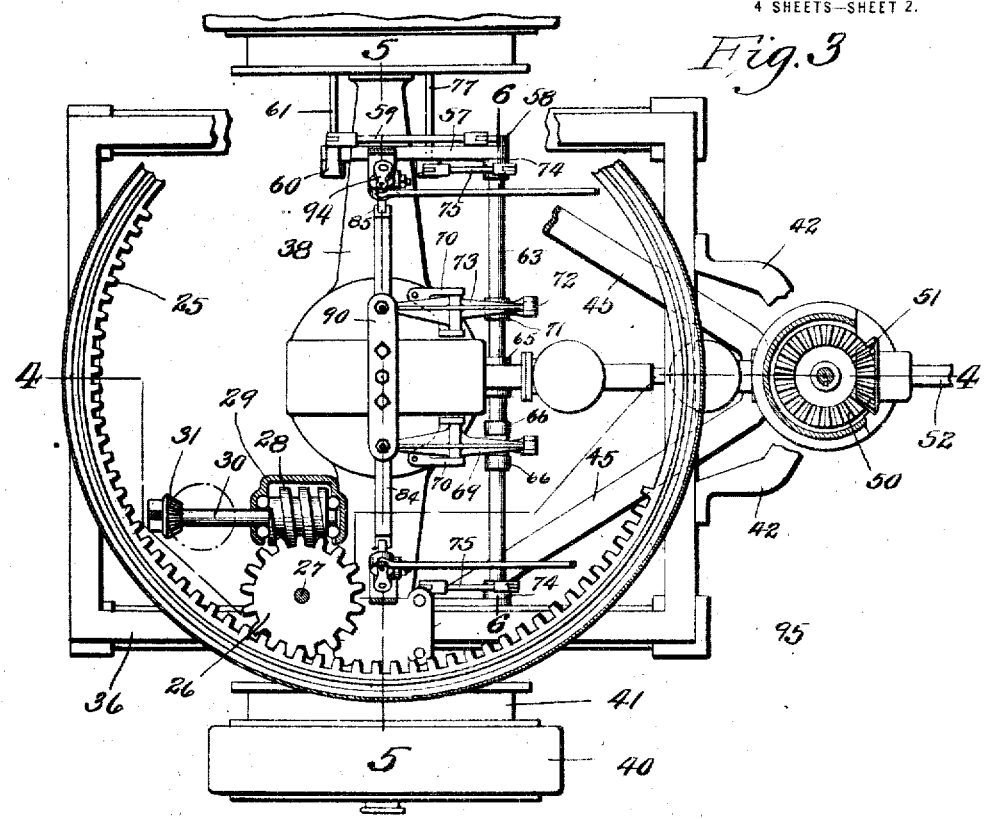
Fig. 3 is an enlarged horizontal section taken approximately on the line 3—3 of Fig. 2.

Referring by numerals to the accompanying drawings, 10 designates the main frame of a motor truck, the rear portion thereof being supported in any suitable manner upon semi-elliptic springs 11, and the latter being carried by the end portions of the housing 12 for the rear axle. Carried by the ends of this rear axle are the rear drive wheels 13 and associated with each wheel is a brake drum 14. These drums are fitted with expanding brake shoes of any desired construction, but preferably of the type illustrated in Fig. 9, this form being well known in the art and readily obtainable in the open market.

Mounted on suitable supports on the forward portion of the frame 10 is a motor 15, preferably an internal combustion engine, and extending rearwardly therefrom is the engine shaft 16, the same having driving connection with a sectional shaft 17, the rear portion of the latter having driving connection with the differential gearing forming a part of the rear axle.

Secured to the under side of the forward portion of frame 10 is a bearing ring 18 in the under side of which is formed a ball race 19. Positioned immediately beneath this fixed bearing ring is a revolving ring 20 in the top of which is a ball race 21 which coincides with the race 19 and occupying these recesses is a series of balls 22.

Secured in any suitable manner to the outer face of the fixed ring 18 is the upper portion of a channel-shaped member 23, the same overlying the outer face of ring 21 and the lower inwardly projecting flange 24 of which member lies immediately beneath the outer edge of revolving ring 21.

A portion of the inner face of ring 21 is toothed in order to form a segmental rack 25, the length of said rack being slightly greater than half the circumference of said ring.

Figure 4:
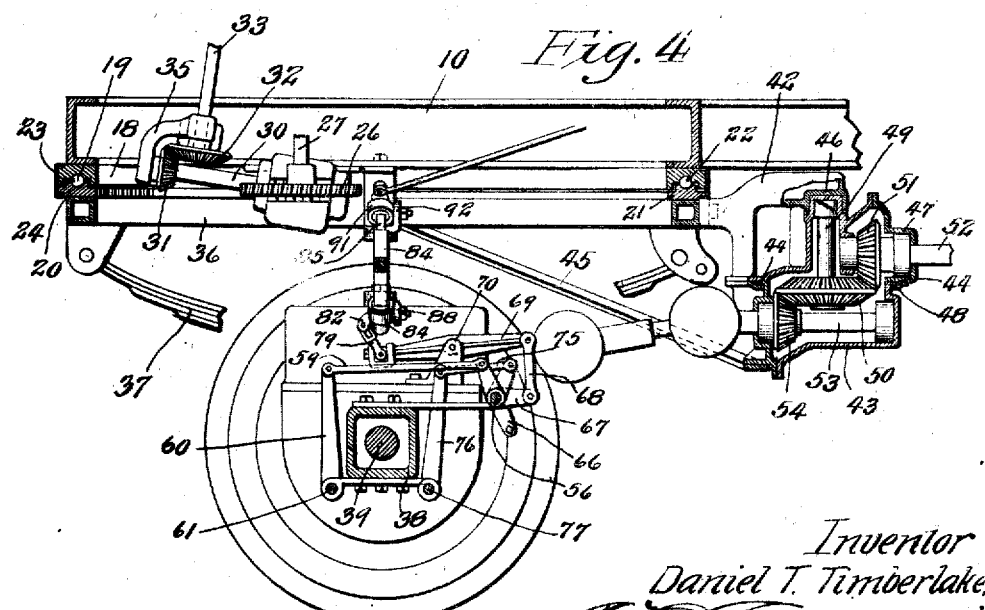
Fig. 4 is a vertical section taken approximately on the line 4—4 of Fig. 3.

Meshing with the teeth of this rack 25 are the teeth of a pinion 26, the same being carried upon a shaft 27, which latter is journaled in a suitable bearing on the main frame 10. The teeth of this pinion engage a worm 28, the latter being mounted for operation within a housing 29, and the latter being secured in any suitable manner to a part of the main frame 10. Worm 28 is provided with a forwardly projecting shaft 30 which carries a small beveled pinion 31 and meshing therewith is a beveled pinion 32 which is carried by the lower end of a steering shaft 33. This shaft extends upwardly a suitable distance above main frame 10 and is provided at its upper end with a steering wheel 34. Shaft 33 is journaled in suitable bearings carried by frame 10 and a portion of the lower one of these bearings is extended downward as designated by 35 to form a bearing for the outer end of shaft 30. (See Figs. 3 and 4.)

Fixed in any suitable manner to the under side of revolving ring 21 is a substantially rectangular frame 36, the same resting on semi-elliptic springs 37 and the latter being positioned on the end portions of the housing 38 for the front axle 39. The ends of this axle are provided with combined steering and traction wheels 40 and associated with each of these wheels is a brake drum 41 fitted with internal expanding brake shoes preferably of the type illustrated in Fig. 9.

Fixed in any suitable manner to the rear side of rectangular frame 36 is a rearwardly projecting bracket 42, the lower portion of which supports a substantially horizontally disposed gear box or housing 43, the latter being provided on its upper edge with an outwardly projecting annular flange 44. This gear housing 43 is held rigidly in position by means of angular braces 45, the forward ends of the latter being secured to the side portions of frame 36. The upper central portion of bracket 42 is provided with a bearing 46 in which is journaled the upper end of a gear box or housing 47, the lower portion of the latter resting directly upon flange 44 and being provided with an annular collar or retaining ring 48 which engages beneath said flange 44. Thus the gear box 47 is held to rotate on a vertical axis, the latter passing through the center of bearing 46.

Journaled for rotation in suitable bearings in the gear box 47 is a vertically disposed shaft 49 and carried by the lower end thereof is a double-faced beveled pinion 50. Meshing with the upper portion of beveled pinion 50 and occupying the outer portion of gear box 47 is a beveled pinion 51, the same being carried on the forward end of one of the members of a telescopic or extensible shaft 52, the latter being preferably of the type disclosed in my patent of July 22, 1919, on telescopic shafts, No. 1,310,971.

This telescopic or extensible shaft constitutes one of the members of the sectional driving shaft 17 which is effective in transmitting the power and motion of the motor shaft 16 to the front and rear axles of the truck. Journaled in the lower portion of gear box 43 is a short horizontally disposed shaft 53 which carries a beveled pinion 54, the same meshing with the lower toothed face of beveled pinion 50 and the forward end of this shaft 53 is connected by a telescopic and jointed shaft 55 to the differential gearing arranged within the central portion of housing 38 and associated with the front axle 39.

The mechanism so far described constitutes the steering gearing for the motor truck and the operation thereof is as follows:

The power and motion of engine shaft 16 is transmitted through the rear portion of the sectional driving shaft 17 to the differential associated with the rear axle, and consequently both rear wheels 13 are positively driven. Power and motion of the engine shaft is likewise transmitted through telescopic section 52 carrying at its forward end beveled pinion 51, the latter driving the double faced beveled pinion 50 and which latter drives beveled pinion 54 carried by shaft 53. This shaft in turn drives the telescopic sectional shaft 55, the forward end of which is associated with the differential forming a part of the front axle, and consequently both front wheels 40 are positively driven.

It will be understood, of course, that driving shaft 17 and likewise shaft 55 are fitted with clutches, the same being preferably arranged in a manner set forth in my copending application filed March 8, 1917, Serial No. 153,307, and which clutches control the transmission of power and motion from the engine shaft to the front and rear axles.

A driver's seat (not shown) is positioned immediately to the rear of the steering wheel 34 and from this seat the driver can readily grasp the steering wheel and manipulate the steering gear as the truck moves forward.

As steering post 33 is rotated, its motion is transmitted through beveled pinions 32 and during this movement the revolubly mounted gear box 47 will turn upon its vertical axis which is the center of bearing 46 and during such turning movement will bear upon flange 44 of the lower gear box. As this turning movement of the frame 36 takes place, the telescopic shaft 52 will elongate to accommodate the lateral movement of the gear boxes carried by said frame.

A telescopic portion of shaft 55 will permit the front axle 39 and parts carried thereby to move vertically relative to frame 36. The brake system forming a part of my invention includes a shaft 56 which occupies a position immediately to the rear and parallel with front axle and said shaft being journaled in bearings 57 which are carried by and project rearwardly from the end portions of front axle housing 38. Fixed to the ends of this shaft 56 are upwardly projecting crank arms 58 to which are pivotally connected the rear ends of short forwardly projecting rods 59, the same passing over the end portions of housing 38 and their forward ends being pivotally connected to the upper ends of short crank arms 60. These crank arms are fixed on the inner ends of short rock shafts 61 which are journaled in suitable bearings on housing 38, and the outer portions of said rock shafts extend into the front brake drums 41 and carry eccentrics 62 which are arranged to operate a pair of the expanding brake shoes in said drums. (See Fig. 9.)

Loosely mounted on shaft 56 is a pair of sleeves 63 and 64, the longer one 63 being journaled in a bearing 65 which projects rearwardly from the central portion of housing 38. These sleeves are spaced apart a slight distance and their adjacent ends are connected by a pair of short depending arms 66. By virtue of this connection, the sleeves 63 and 64 operate simultaneously.

Fixed on the shaft 56 between the inner ends of sleeves 63 and 64 is a short crank arm 67 to which is pivotally connected the lower end of a link 68, the upper end of the latter being pivotally connected to a lever 69 which is fulcrumed at 70 to a bracket that is mounted on housing 38 immediately to the left of the center thereof. Fixed to sleeve 63 to the right of bearing 65 is a crank arm 71 corresponding to the crank arm 67 and the outer end of said crank arm 71 is connected by a link 72 to the rear end of a horizontally disposed lever 73 which is a counter part of the lever 69 and said lever 73 being fulcrumed on housing 38 immediately to the right of the center thereof.

Fixed to and projecting upwardly from the outer ends of sleeves 63 and 64 are crank arms 74 to the upper ends of which are pivotally connected the rear ends of short links 75, the forward ends thereof being pivotally connected to the upper ends of crank arms 76. The lower ends of these crank arms are mounted on rock shafts 77, the same being journaled in suitable bearings on housing 38 and the outer portions of said rock shafts project into the brake drums 41 and carry eccentrics 78 which are adapted to operate a pair of the expanding shoes within said drums.

The forward ends of the levers 69 and 73 are connected by suitable universal joints 79 to swiveled links 80, the upper ends of the latter being connected by suitable universal joints 81 to the outer ends of short crank arms 82 which latter project outwardly from collars 83. These collars are fixed on the lower ends of sleeves 84 which are square or non-circular in cross section and in which are arranged for sliding movement square or non-circular rods 85. The collars 83 are mounted for rotation in bearings 86 which latter are provided with horizontally disposed studs 87 and the latter being journaled in the lower portions of angle brackets 88. The upper portions of these brackets 88 are provided with vertically disposed studs 89 which are journaled in the outer ends of a plate or bracket 90, which latter is fixed in any suitable manner on top of the central portion of housing 38. The upper ends of rods 85 are made round in order to form journals which are rotatably mounted in bearings 91, and these bearings are pivotally mounted on brackets 92, the latter being carried by the lower portions of angle brackets 93 which are fixed to and depend from the side rails of frame 10.

The ends of the journals which project through the bearings 91 are provided with short crank arms 94. Pivotally connected to the upper end of the lefthand one of these crank arms 94 is the forward end of a longitudinally disposed rod 95 and connected to the righthand one of said crank arms is the forward end of a longitudinally disposed rod 96.

Journaled in suitable bearings on the main frame 10 a short distance to the rear of the revolving frame 36 is a shaft 97 on which is loosely mounted an inner sleeve 98 and an outer sleeve 99. Fixed on this shaft near the righthand end thereof is a depending crank arm 100 to the end of which is pivotally connected the rear end of rod 95. Fixed to the righthand end of outer sleeve 90 is a depending crank arm 101 and pivotally connected to the lower end thereof is the rear end of connecting rod 96.

The rear brake drums 14 are fitted with pairs of expanding brake shoes as illustrated in Fig. 9, and each pair of said shoes are adapted to be actuated by eccentrics carried by the outer ends of a pair of rock shafts 102 and 103, the same being arranged in front of the rear axle and also by a pair of rock shafts 104 and 105 disposed to the rear of said rear axle. These rock shafts are journaled in suitable bearings on the underside of housing 12. The inner ends of the rock shafts 102 and 103 carry upwardly projecting crank arms 106 and 107 respectively, and the opposite pair of rock shafts 104 and 105 carry respectively upwardly projecting crank arms 108 and 109.

Fixed on shaft 97 near the lefthand end thereof is a depending crank arm 110, to the lower end of which is pivotally connected the forward end of a longitudinally disposed rod 111, the rear end thereof being pivotally connected to crank arm 108. Fixed on the lefthand end of inner sleeve 98 is a depending crank arm 112 and pivotally connected to the lower end thereof is the forward end of a rod 113, the rear end thereof being pivotally connected to the upper end of crank arm 106. Fixed on the shaft 97 near the crank arm 100 is a depending crank arm 114 to which is pivotally connected the forward end of a rod 115, the rear end of the latter being pivotally connected to crank arm 109. Pivotally connected to this crank arm 100 is the rear end of a forwardly extending rod 116, the forward end of which is pivotally connected to a foot lever 117, the latter being fulcrumed at its lower end to a part of the frame 10 in front of and below the driver's seat.

Pivotally mounted on this foot lever is a spring-held ratchet bar 118 which is adapted to engage a hook or detent 119, the latter being fixed to the frame 10 in front of pedal 117.

Fixed on the lefthand end of sleeve 98 is a depending crank arm 120 and pivotally connected thereto is the forward end of a connecting rod 121, the rear end of which is pivotally connected to crank arm 107. Pivotally connected to crank arm 120 is the rear end of a forwardly extending rod 122, the forward end of which is pivotally connected to a foot pedal (not shown) which is identical in construction with and located adjacent to pedal 117.

Fixed on the left hand end of sleeve 99 is a depending crank arm 123 to which is pivotally connected the rear end of a rod 124, the forward end of which is pivotally connected to a third foot pedal identical in construction with and located adjacent to pedal 117.

Formed integral with and projecting laterally from crank arm 123 is a finger 125 which bears immediately against the rear side of crank arm 120.

The universal joints between the forward ends of levers 69 and 83 and the lower ends of sleeves 84, the connections between the lower ends of said sleeves and the ends of plate 90, and the connections between the upper ends of the rods 85 and the brackets 92 together with the telescopic connections between said rods 85 and sleeves 84, permit the front axle and parts carried thereby to swing laterally during the steering movement without affecting the connections between the rods 95 and 96 and the parts to which said rods are connected, and at the same time said rods 95 and 96 can be actuated and through the connections just mentioned, the rock shafts 61 and 77 will be actuated to set the brakes within the drums 41 on the front wheels.

To operate a pair of the brake shoes on the front brake drums and likewise a pair of the brake shoes in the rear drums, foot pedal 117 is moved forwardly and through rod 116 and crank arm 114, shaft 97 will be rocked, consequently swinging crank arms 100 and 110, which latter are fixed to said shaft. As a result of this movement, rods 111 and 115 will be pulled forwardly and through crank arms 108 and 109, rock shafts 104 and 105 will be actuated, thereby actuating the eccentrics between a pair of the expanding brake shoes in the rear brake drums 14 and forcing said brake shoes into frictional engagement with the internal surface of said drums. At the same time, rod 95 connected to crank arm 100 will be drawn rearwardly and the forward end of said rod connected to the lefthand one of crank arms 94 will rock the corresponding telescopic shaft comprising the parts 84 and 95, with the result that lever 69 will be actuated and through link 67 shaft 56 will be rocked. The motion thus imparted to rock shaft 56 will be transmitted through crank arms 58, rods 59 and crank arms 60 to rock shafts 61 and the eccentrics carried by the latter will actuate a pair of brake shoes in each of the front brake drums.

When it is desired to operate only one pair of brake shoes in each rear brake drum, the foot pedal connected to rod 122 is actuated, and as a result, inner sleeve 98 will be rocked and through crank arms 112 and 120 carried by said sleeve, rods 113 and 121 will be pulled forwardly and through crank arms 106 and 107, shafts 102 and 103 will be rocked, thereby actuating a pair of brake shoes in each rear drum.

If it is desired to set all of the brake shoes, that is, the two pairs in each drum, the operator after actuating foot lever 117, as hereinbefore described, actuates foot lever connected to rod 124, and this action through crank arm 123 rocks the outer sleeve 99. Finger 125 bearing against crank arm 120 actuates the latter to rock inner sleeve 98, and as a result, rods 113 and 121 are pulled forwardly to actuate crank arms 106 and 107, thereby rocking shafts 102 and 103 to set the inner pairs of brake shoes in the rear pair of drums and at the same time, crank arm 101 carried by sleeve 99 will draw rod 96 rearwardly, thereby rocking the righthand one of the telescopic shafts composed of the parts 84 and 85 and through the flexible connections at the lower end of this shaft, lever 73 will be actuated. The movement of this lever through crank arm 72 will rock sleeves 63 and 64 which are connected by arms 66, and this movement swings crank arms 74 and moves rods 75 to swing crank arms 86 and rock shafts 77, thus setting the inner pairs of brake shoes on the front drums 41.

A steering gear of my improved construction is comparatively simple, is capable of being easily operated, and is very positive and efficient in use. The brake system associated with the truck and steering gear is relatively simple and while very flexible and readily yielding to all movements of the steering gear, is effective in performing its intended functions.

It will be readily understood that minor changes in the size, form and construction of the various parts of my improved steering gear may be made and substituted for those herein shown and described, without departing from the spirit of my invention, the scope of which is set forth in the appended claim.

I claim:

In a motor truck provided with a main frame, a ring positioned beneath the frame, a second ring provided with teeth on its inner face and adapted to revolve beneath the first ring, anti-friction bearings between the rings, a frame carried by the second ring, an axle and wheels carried by said frame, a laterally projecting bracket secured to said frame, a gear housing revolubly mounted in said bracket, driving gears in said housing, driving connections between said gears and front axle, a pinion meshing with said teeth of the second ring, a shaft adjacent to the pinion, a worm mounted thereon, and a substantially vertical steering staff for rotating said shaft.

In testimony whereof I hereunto affix my signature, this 23d day of October, 1918.

DANIEL T. TIMBERLAKE.